United States Patent
Shibano

[11] Patent Number: 5,774,443
[45] Date of Patent: Jun. 30, 1998

[54] OPTICAL HEAD DEVICE CAPABLE OF REDUCING THE LIGHT POWER LOSS

[75] Inventor: Motomichi Shibano, Kawasaki, Japan

[73] Assignee: Fujitsu Limited, Kawasaki, Japan

[21] Appl. No.: 771,315

[22] Filed: Dec. 20, 1996

[30] Foreign Application Priority Data

Jul. 16, 1996 [JP] Japan ................................ 8-186157

[51] Int. Cl.$^6$ ........................................................ G11B 7/00
[52] U.S. Cl. ........................................... 369/103; 369/112
[58] Field of Search ....................................... 369/112, 103, 369/109, 44.14, 44.18, 44.21, 44.23

[56] References Cited

U.S. PATENT DOCUMENTS

| | | | |
|---|---|---|---|
| 5,161,040 | 11/1992 | Yokoyama et al. | 369/44.14 |
| 5,303,221 | 4/1994 | Maeda et al. | 369/112 |
| 5,446,565 | 8/1995 | Komma et al. | 369/112 |

*Primary Examiner*—Tan Dinh
*Attorney, Agent, or Firm*—Staas & Halsey

[57] ABSTRACT

An optical head for an optical disk drive which can reduce the light power loss due to the beam characteristics of a laser beam to improve the efficiency of use of laser power. The optical head includes a laser diode, an objective lens for focusing a laser beam emitted from the laser diode onto an optical disk, an optical signal detector for detecting an optical signal from a reflected beam reflected on the optical disk, an error signal detector for detecting a focusing error and a tracking error of the laser beam focused on the optical disk from the reflected beam, and a collimator lens for collimating the laser beam emitted from the laser diode. Further, a hologram-lens unit is located between the laser diode and the collimator lens. The hologram-lens unit includes a gradient index microlens formed on one surface of a transparent substrate and a hologram formed on the other surface of the transparent substrate. The hologram transmits the laser beam emitted from the laser diode, and diffracts the reflected beam toward the error signal detector.

16 Claims, 15 Drawing Sheets

ASTIGMATIC DIFFERENCE

OPTICAL HEAD DEVICE CAPABLE OF REDUCING THE LIGHT POWER LOSS

BACKGROUND OF THE INVENTION

1. Field of the Invention

The present invention relates to an optical head (optical pickup) for an optical disk drive.

2. Description of the Related Art

An optical disk inclusive of a magneto-optical disk is in the limelight as a memory medium which has become the core in the rapid development of multimedia in recent years. Usually, the optical disk is accommodated in a cartridge for actual use. An optical disk cartridge is loaded into an optical disk drive to read/write data on the optical disk by an optical head. In general, a semiconductor laser (laser diode) is used as a light source in the optical disk drive.

A recording medium such as an optical disk and a magneto-optical disk is replaced by another similar recording medium in use, and these recording media have warpage or undulation due to strain in molding. As a result, such a recording medium tends to have eccentricity and tilt. Accordingly, focusing error detection and tracking error detection must be accurately performed to read information recorded on the recording medium.

A conventional optical head for an optical disk drive is configured by using many optical components including a plurality of lenses and a plurality of polarized beam splitters to detect information recorded on an optical disk and further detect a focusing error and a tracking error. As another conventional optical head for an optical disk drive, various configurations employing a hologram have been proposed. An example of such a conventional optical head employing a hologram will now be described with reference to FIG. 1.

A laser beam 4 emitted from a semiconductor laser or laser diode 2 is transmitted by a hologram unit 6 including a transparent substrate 8 and a hologram 10 formed on the substrate 8, and next enters a collimator lens 12, by which the laser beam 4 is converted into a collimated beam 14. The collimated beam 14 transmits through a polarized beam splitter 16 and enters an objective lens 18, by which the collimated beam 14 is focused on a magneto-optical disk 20.

A reflected beam reflected on a recording surface of the magneto-optical disk 20 is reconverted into a collimated beam by the objective lens 18, and next enters the polarized beam splitter 16, by which the collimated beam is split into a reflected beam 22 and a transmitted beam 24. The beam 22 reflected by the polarized beam splitter 16 is separated into a P-polarized light component and an S-polarized light component by a Wollaston prism 26, and next detected by a photodetector unit 30. The photodetector unit 30 includes a photodetector for detecting the P-polarized light component and a photodetector for detecting the S-polarized light component. Signals detected by the two photodetectors are subjected to differential detection well known in the art, thereby detecting a magneto-optical signal.

The beam 24 transmitted by the polarized beam splitter 16 is condensed by the collimator lens 12 to enter the hologram 10, by which the incident beam 24 is diffracted toward a photodetector unit 32 and detected by the photodetector unit 32. The photodetector unit 32 includes a plurality of first photodetectors for detecting a focusing error signal and a plurality of second photodetectors for detecting a tracking error signal. Then, the focusing error signal and the tracking error signal are detected by the first photodetectors and the second photodetectors, respectively.

In the optical head shown in FIG. 1, the effective use of laser power is of importance. Therefore, an antireflection film coating is formed on the surface of each optical component to optimize the transmittances and/or reflectivities of the hologram 10, the polarized beam splitter 16, etc. However, the loss of laser power is yet high in the above optical head. One of the causes of such high loss is the divergence of the laser beam 4 emitted from the laser diode 2. That is, all proportions of the laser beam 4 emitted from the laser diode 2 are not incident on the collimator lens 12. Specifically, about 40% of the laser beam 4 does not enter the collimator lens 12 because of the divergence of the laser beam 4 as shown in FIG. 1.

As shown in FIG. 2A, the collimator lens 12 is conventionally positioned with respect to the laser diode 2 so that about 40% of the laser beam 4 emitted from the laser diode 2 does not enter the collimator lens 12. Although the light not entering the collimator lens 12 becomes loss, a large aperture in the objective lens 18 can be obtained to improve the focusing characteristics of the laser beam on the surface of the magneto-optical disk 20.

FIG. 3 shows the relation between the beam shape (beam pattern) of the laser beam 4 emitted from the laser diode 2 and the collimator lens 12 in the case that emphasis is placed on the focusing characteristic of the laser beam. As apparent from FIG. 3, the laser beam 4 emitted from the laser diode is elliptical in cross section. In the case that emphasis is placed on incorporation of the laser beam 4 from the laser diode 2 into the collimator lens 12, the positional relation between the collimator lens 12 and the laser diode 2 is changed to a relation shown in FIG. 2B. That is, as shown in FIG. 2B, all proportions of the elliptical laser beam 4 emitted from the laser diode 2 enter a collimator lens 12'.

In the latter case shown in FIG. 2B, however, a component of the elliptical laser beam 4 along its minor-axis direction enters the objective lens 18 with insufficient aperture of incident light on the objective lens 18. Accordingly, a beam spot formed on the magneto-optical disk 20 becomes large. Of the above two cases, the beam spot size on the recording medium is conventionally taken as a matter of high priority. Accordingly, the collimator lens 12 is positioned with respect to the laser diode 2 so that about 40% of the laser beam 4 does not enter the collimator lens 12 as shown in FIG. 2A. In this case, however, the focusing characteristics of the beam by the objective lens are degraded because of the astigmatic difference of the laser beam.

SUMMARY OF THE INVENTION

It is therefore an object of the present invention to provide an optical head for an optical disk drive which can reduce the light power loss due to the characteristics of the laser beam emitted from the laser diode, thereby efficiently using the laser power.

In accordance with an aspect of the present invention, there is provided an optical head for an optical disk drive, for reading and writing information on an optical disk, the optical head comprising a laser diode for emitting a laser beam; an objective lens for focusing the laser beam onto the optical disk; an optical signal detector for detecting an optical signal from a reflected beam reflected on the optical disk; an error signal detector for detecting a focusing error and a tracking error of the laser beam focused on the optical disk, from the reflected beam; a first lens for collimating the laser beam emitted from the laser diode; a transparent plane substrate interposed between the laser diode and the first lens, the transparent plane substrate having a first surface opposed to the laser diode and a second surface opposed to the first lens; a second lens formed integrally with the transparent plane substrate on the first surface or in the vicinity of the first surface of the substrate; and a hologram formed integrally with the transparent plane substrate on the second surface, for transmitting the laser beam emitted from the laser diode and diffracting the reflected beam toward the error signal detector.

Preferably, the second lens has an astigmatic difference compensating for the astigmatic difference of the laser beam emitted from the laser diode. For example, the second lens is formed in an elliptical shape, and is positioned so that the major-axis direction of the second lens coincides with the minor-axis direction of the laser beam. Further, the second lens is formed as a gradient index lens. In this case, the surface of the lens element can be maintained plane. As a result, a thin film such as a reflection preventing film coating can be easily added to the surface of the lens element, thereby improving the convenience in handling.

In accordance with another aspect of the present invention, there is provided an optical head for an optical disk drive, for reading and writing information on an optical disk, the optical head comprising a laser diode for emitting a laser beam; an objective lens for focusing the laser beam onto the optical disk; an optical signal detector for detecting an optical signal from a reflected beam reflected on the optical disk; an error signal detector for detecting a focusing error and a tracking error of the laser beam focused on the optical disk, from the reflected beam; a first transparent plane substrate interposed between the laser diode and the objective lens, the first transparent plane substrate having a first surface opposed to the laser diode and a second surface opposite to the first surface; a hologram formed integrally with the first transparent plane substrate on the first surface, for transmitting the laser beam emitted from the laser diode and diffracting the reflected beam toward the error signal detector; a first lens formed integrally with the first transparent plane substrate on the second surface, for collimating the laser beam emitted from the laser diode; and a second lens interposed between the laser diode and the hologram.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
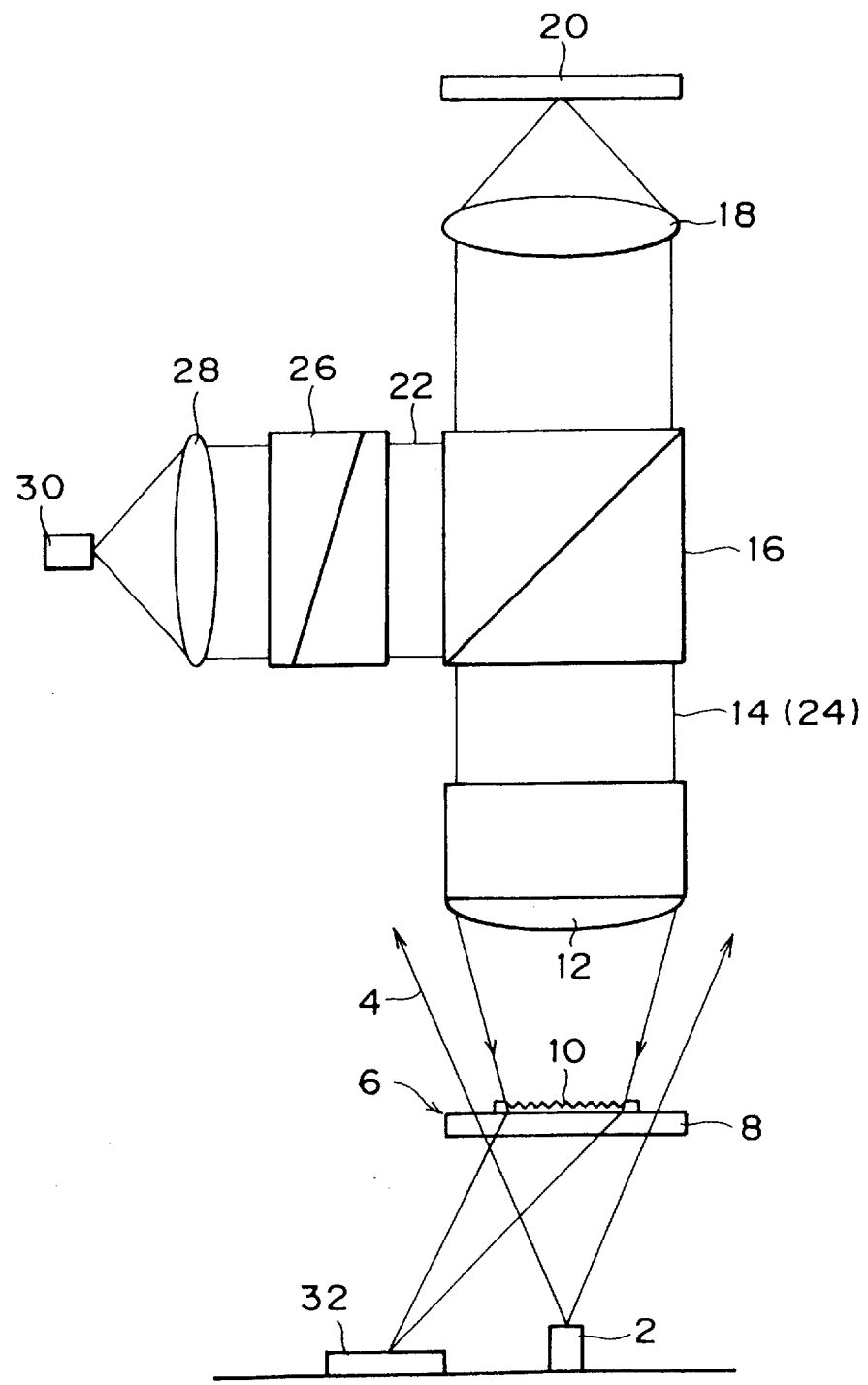
FIG. 1 is a view showing a general configuration of an optical head for an optical disk drive in the prior art.
Figure 2A:
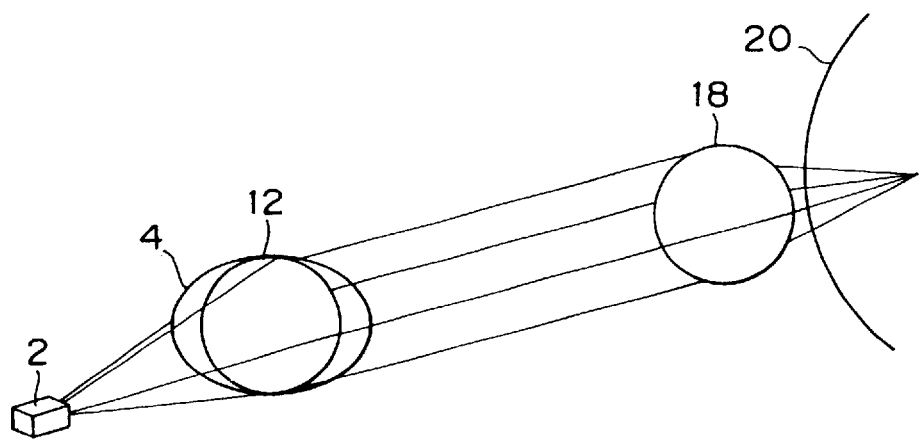
FIG. 2A–2B is a view showing the relation between a beam shape and a lens system in the prior art.
Figure 2B:
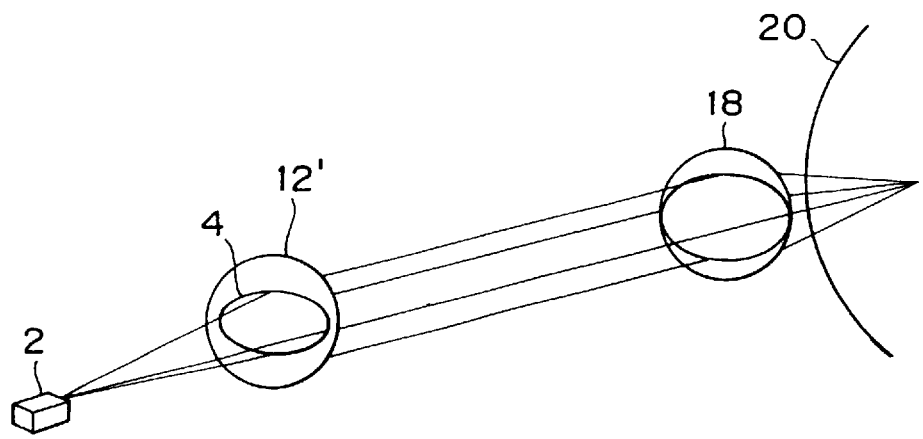
Figure 4:
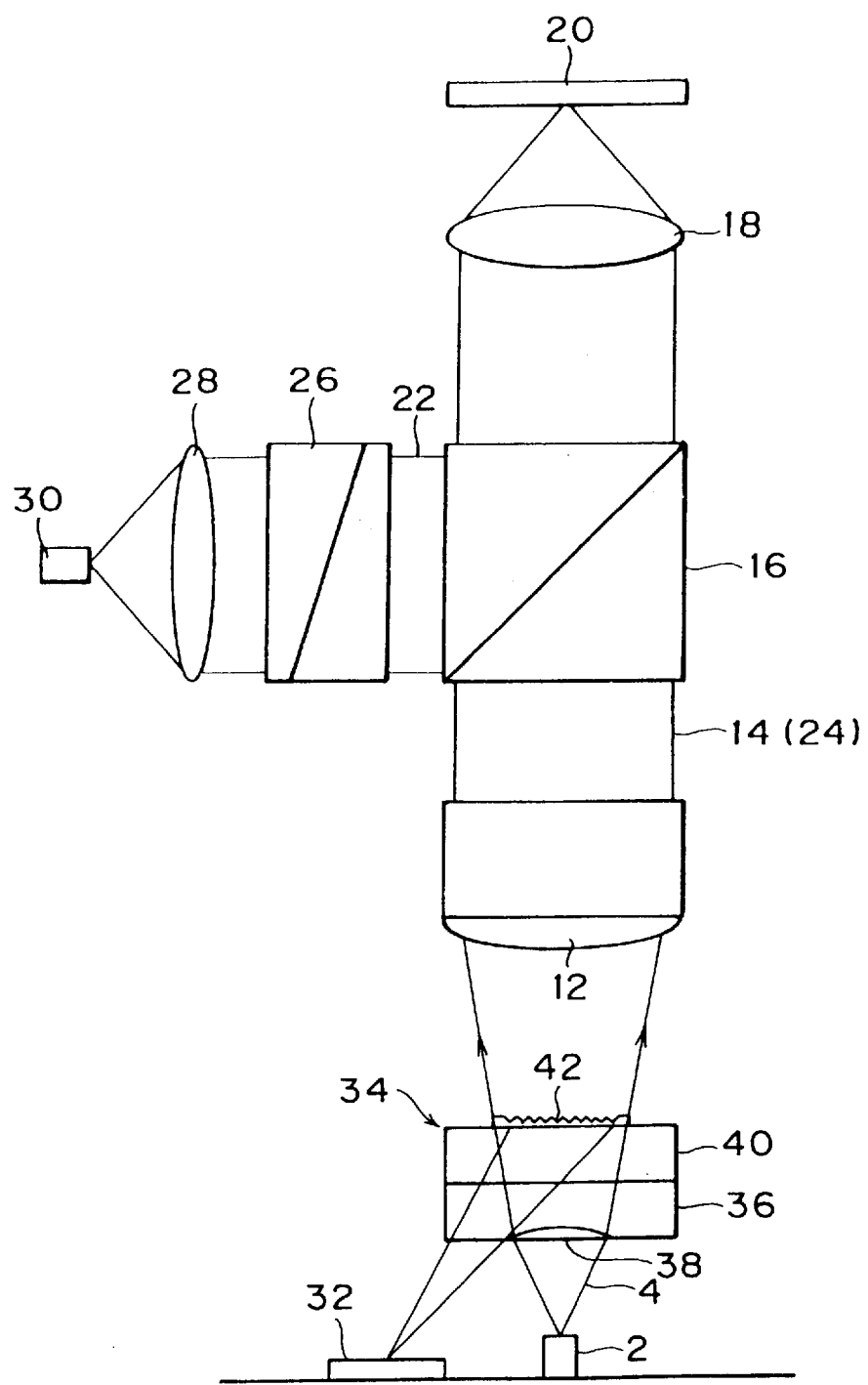
FIG. 4 is a view showing a general configuration of an optical head for an optical disk drive according to a first preferred embodiment of the present invention.

Referring to FIG. 4, there is shown a general configuration of an optical head according to a first preferred embodiment of the present invention. In the following description of some preferred embodiments of the present invention, substantially the same parts as those shown in FIG. 1 representing the prior art will be denoted by the same reference numerals. Reference numeral 34 denotes a hologram-lens unit, which is composed of a transparent substrate 36 having a surface formed with a gradient index microlens 38 and a transparent substrate 40 having a surface formed with a hologram 42 as a diffraction optical element. The transparent substrates 36 and 40 are bonded together by an optical adhesive.

A laser beam 4 emitted from a laser diode 2 is refracted in a converging direction by the microlens 38, and next transmitted by the hologram 42 to enter a collimator lens 12. Since the beam 4 is refracted in the converging direction by the microlens 38, almost all components of the beam 4 emitted from the laser diode 2 can be coupled to the collimator lens 12. The laser beam 4 incident on the collimator lens 12 is converted into a collimated beam 14 by the collimator lens 12 to enter a polarized beam splitter 16. The laser beam 4 emitted from the laser diode 2 to the polarized beam splitter 16 is a P-polarized light beam. Therefore, in this preferred embodiment, the laser beam 4 of P-polarized light is transmitted by the polarized beam splitter 16 with a transmittance of about 95%, and next focused on a magneto-optical disk 20 by an objective lens 18.

The laser beam 4 is reflected on a recording surface of the magneto-optical disk 20, and a resultant reflected beam includes an S-polarized light component due to Kerr effect according to information recorded on the magneto-optical disk 20. This reflected beam is reconverted into a collimated beam by the objective lens 18 to enter the polarized beam splitter 16. The collimated beam incident on the polarized beam splitter 16 is split into a reflected beam 22 and a transmitted beam 24. The P-polarized light component in the reflected beam from the magneto-optical disk 20 is transmitted by the polarized beam splitter 16 with a transmittance of about 95%, and about 5% of the P-polarized light component is therefore reflected by the polarized beam splitter 16. On the other hand, the S-polarized light component in the reflected beam from the magneto-optical disk 20 is reflected by the polarized beam splitter 16 with a reflectivity of about 85%.

The beam 22 reflected by the polarized beam splitter 16 enters a Wollaston prism 26, by which the beam 22 is separated into a P-polarized light component and an S-polarized light component, and next focused to a photodetector unit 30 by a lens 28. The photodetector unit 30 includes a photodetector for detecting the P-polarized light component and a photodetector for detecting the S-polarized light component. Signals detected by the two photodetectors are subjected to differential detection by a method well known in the art, thereby detecting a magneto-optical signal.

Figure 5:
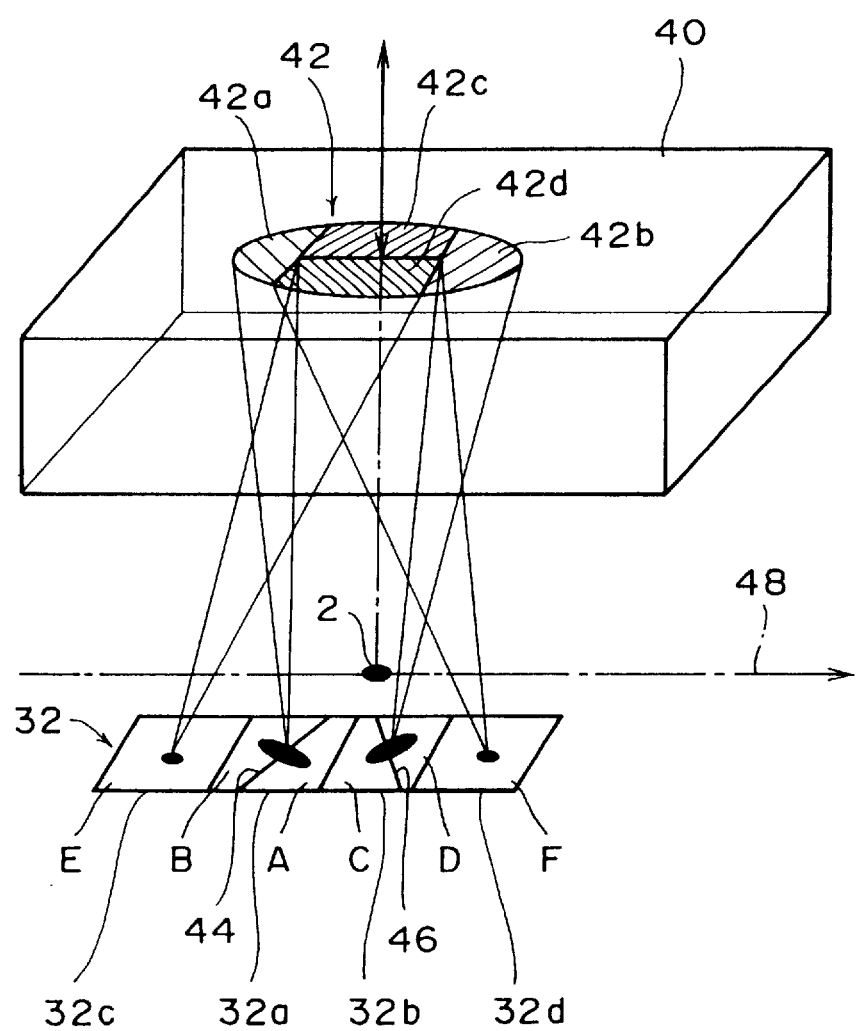
FIG. 5 is a view showing the relation between a hologram and an error signal detector.

On the other hand, the beam 24 transmitted by the polarized beam splitter 16 is condensed by the collimator lens 12 to enter the hologram 42, by which the beam 24 is diffracted to enter a photodetector unit 32. As shown in FIG. 5, the hologram 42 has four different hologram-pattern regions 42a, 42b, 42c, and 42d. The beam 24 incident on the four regions 42a to 42d of the hologram 42 is diffracted in four different directions. The transparent substrate 36 and the microlens 38 shown in FIG. 4 are not shown in FIG. 5.

The photodetector unit 32 includes two photodetectors 32a and 32b for detecting a focusing error and two photodetectors 32c and 32d for detecting a tracking error. The photodetector 32a is divided into two regions by a division line 44, and the photodetector 32b is also similarly divided into two regions by a division line 46. An arrow 48 denotes a track direction of the magneto-optical disk 20. The regions 42a and 42b of the hologram 42 are used for detection of a focusing error signal (FES), and the regions 42c and 42d of the hologram 42 are used for detection of a tracking error signal (TES). The size of each of the regions 42a to 42d is determined according to distribution of light power to be required by a magneto-optical disk drive. The beams diffracted by the regions 42a and 42b enter the photodetectors 32a and 32b for detecting the focusing error signal, respectively. On the other hand, the beams diffracted by the regions 42c and 42d enter the photodetectors 32c and 32d for detecting the tracking error signal.

Letting A denote a power of light incident on the right region of the photodetector 32a with respect to the division line 44, B denote a power of light incident on the left region of the photodetector 32a with respect to the division line 44, C denote a power of light incident on the left region of the photodetector 32b with respect to the division line 46, and D denote a power of light incident on the right region of the photodetector 32b with respect to the division line 46, the focusing error signal (FES) can be detected in accordance with the following equation.

$$FES=(A+C)-(B+D)$$

Letting E denote a power of light incident on the photodetector 32c and F denote a power of light incident on the photodetector 32d, the tracking error signal (TES) can be detected in accordance with the following equation.

$$TES=E-F$$

The gradient index microlens 38 may be fabricated by various methods such as a plastic diffusion polymerization method, an ion exchange diffusion method, and an electrolytic ion migration method. In this preferred embodiment, the gradient index microlens 38 is fabricated by using the ion exchange diffusion method. The material of a substrate for the gradient index microlens 38 may be selected from glass, quartz, plastic, crystal containing a semiconductor, etc. In this preferred embodiment, soda lime glass is used as the material of the substrate.

The ion exchange diffusion method as one of the fabrication methods for a gradient index microlens is a method including a step of diffusing atoms (ions) having a large electron polarizability to molecules in a substrate such as glass to thereby change the refractive index of a region of the substrate where the ions have been diffused, thus forming a lens. The ion concentration in the ion diffused region of the substrate varies in such a manner that the ion concentration is highest at a central portion of the ion diffused region where the diffusion is started, and gradually lowers toward a peripheral portion of the ion diffused region where the ions are radially diffused. The refractive index varies with the gradient of the ion concentration. Further, the ions are spherically diffused. Therefore, the ion diffused region functions as a lens.

Figure 6A:
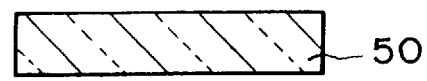
FIG. 6(a) to FIG. 6(f) are views showing a fabrication process for microlenses by a planar method.
Figure 6B:
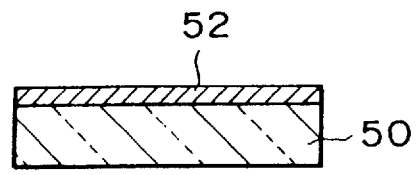
Figure 6C:
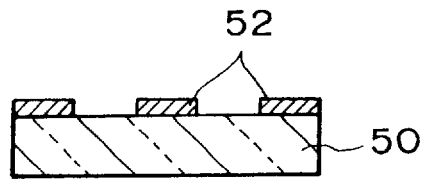

A method of mass-producing many lenses arranged two-dimensionally on a plane substrate by a planar technique will now be described with reference to FIG. 6(a) to FIG. 6(f). As shown in FIG. 6(a), a soda lime glass substrate 50 is first prepared. A Ti film 52 as a protective film is next formed on the glass substrate 50 as shown in FIG. 6(b), so as to pattern an ion diffused portion. A photoresist is next applied to the Ti film 52, and next exposed to light by using a mask having a given pattern. Then, developing and etching are carried out to pattern the Ti film 52 as shown in FIG. 6(c).

Figure 6D:
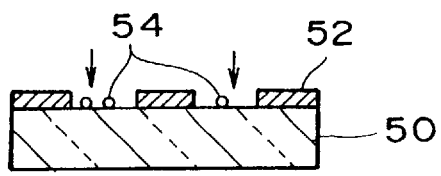
Figure 6E:
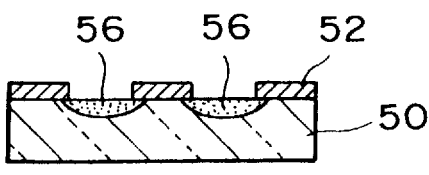
Figure 6F:
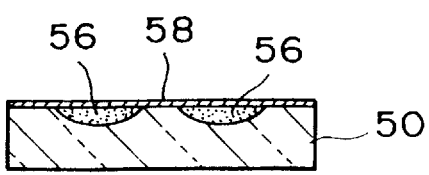

The substrate 50 is next immersed into a molten salt containing ions 54 to be diffused, e.g., silver ions, to inject the ions 54 into the substrate 50 as shown in FIG. 6(d). Diffusion of the ions 54 in the substrate 50 is carried out at high temperatures for tens of hours to form many gradient index microlenses 56 each having a refractive index higher than that of the substrate 50 in the vicinity of the surface of the substrate 50 as shown in FIG. 6(e). Then, the Ti film 52 is removed by surface polishing, and an antireflection film coating 58 is next formed on the surface of the substrate 50 so as to cover the gradient index microlenses 56 as shown in FIG. 6(f), thus completing a microlens array.

Figure 7A:
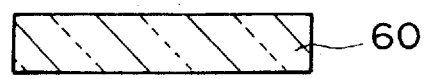
FIG. 7(a) to FIG. 7(f) are views showing a fabrication process for holograms by a planar method.
Figure 7B:
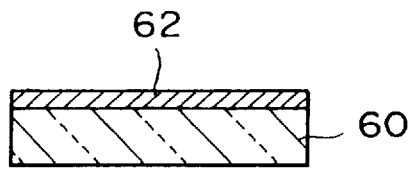

The hologram 42 may be fabricated by various methods such as a planar technique, an etching method, e.g., reactive ion etching, a photopolymer method (2P method) using ultraviolet hardening resin, and an injection method using molten glass. A method of mass-producing many holograms on a plane substrate by a planar technique will now be described with reference to FIG. 7(a) to FIG. 7(f). As shown in FIG. 7(a), a quartz substrate 60 is first prepared, and as shown in FIG. 7(b), a Ti film 62 as a protective film is uniformly formed on the quartz substrate 60.

Figure 7C:
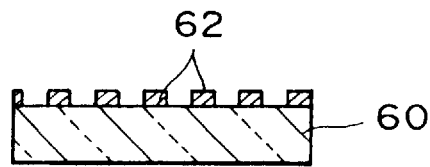
Figure 7D:
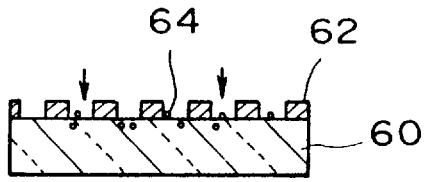
Figure 7E:
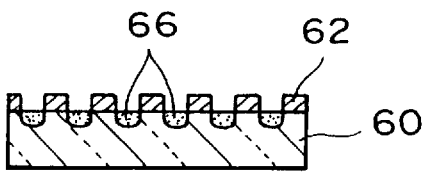
Figure 7F:
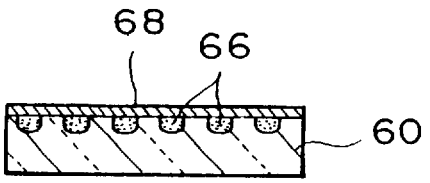

Then, the Ti film 62 is patterned as shown in FIG. 7(c) by photolithography including resist coating, exposure, and developing steps, and by etching. Then, the substrate 60 is immersed into a molten salt containing ions 64 to be diffused to inject the ions 64 into the substrate 60 as shown in FIG. 7(d). Diffusion of the ions 64 in the substrate 60 is carried out at high temperatures for a sufficient time to form many volume holograms 66 at the ion diffused regions of the substrate 60 where the refractive index has been varied as shown in FIG. 7(e). Finally, the Ti film 62 is removed by surface etching, and a reflection preventing film coating 68 is formed on the substrate 60 so as to cover the volume holograms 66 as shown in FIG. 7(f), thus completing a volume hologram array.

The microlens array and the volume hologram array thus manufactured are aligned so that each microlens element and the corresponding volume hologram element have the same optical axis, and next bonded together by using an optical adhesive. Finally, the substrates bonded together are cut into elements by a dicing saw. These elements are used as individual hologram-lens units. In fabricating the hologram elements by using a photopolymer method, the hologram elements can be formed on the lower surface of a substrate whose upper surface is formed with lens elements. Accordingly, this method is advantageous over the planar method because the step of bonding the two substrates required in the planar method can be omitted. Similarly, the hologram elements can be fabricated by an etching method in such a manner that the hologram elements are formed by etching the lower surface of a substrate whose upper surface is formed with lens elements.

Figure 8:
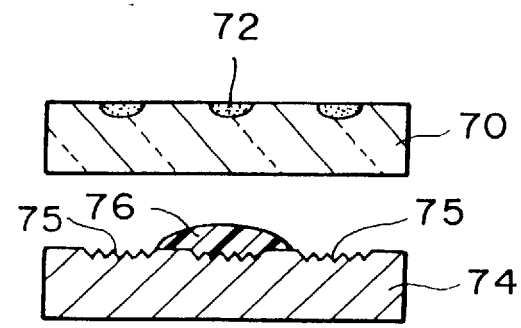
FIG. 8(a) to FIG. 8(c) are views showing a fabrication process for holograms by a photopolymer method.
Figure 8:
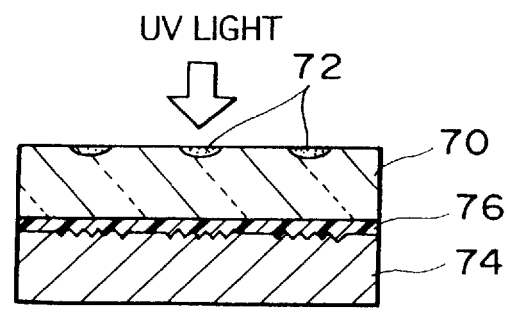
Figure 8:
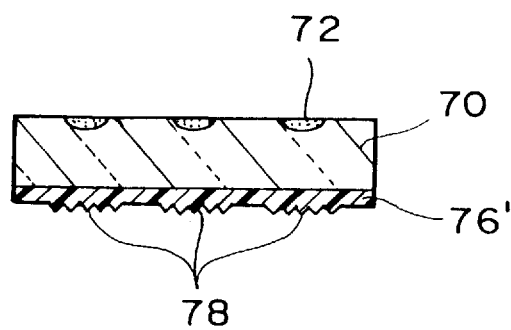

A process of fabricating holograms by using a photopolymer method will now be described with reference to FIG. 8(a) to FIG. 8(c). As shown in FIG. 8(a), a stamper 74 formed with a plurality of hologram patterns 75 and a transparent substrate 70 formed with a plurality of microlens elements 72 are first prepared. A photopolymer 76 is next applied to the stamper 74, and the transparent substrate 70 is laid on the stamper 74 through the layer of the resin 76 with the stamper 74 and the substrate 70 being aligned with each other. As shown in FIG. 8(b), ultraviolet rays are irradiated onto the transparent substrate 70 to thereby harden the ultraviolet hardening resin 76. After the resin 76 is sufficiently hardened, the substrate 70 is separated from the stamper 74 to thereby form holograms 78 on the lower surface of a hardened resin layer 76' as shown in FIG. 8(c).

Figure 9:
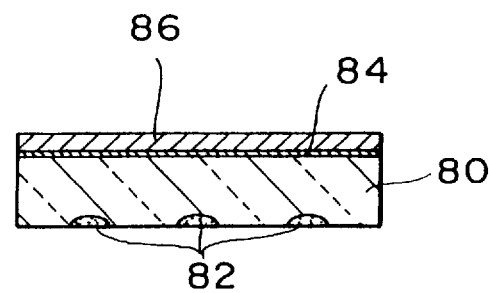
FIG. 9(a) to FIG. 9(d) are views showing a fabrication process for holograms by an etching method.
Figure 9:
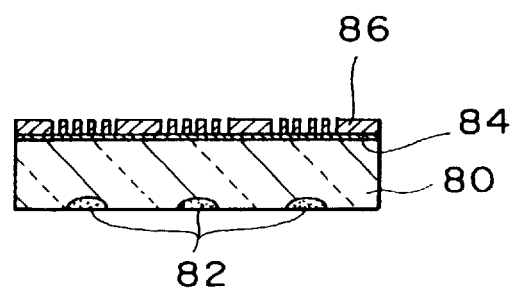
Figure 9:
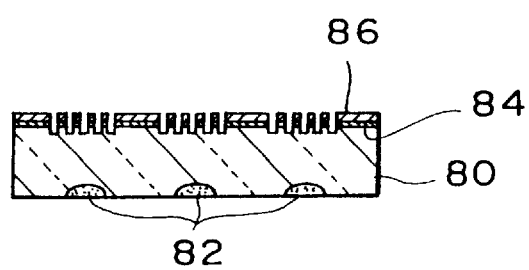
Figure 9:
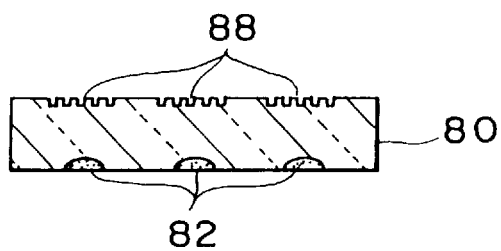

A process of fabricating holograms by using an etching method will now be described with reference to FIG. 9(a) to FIG. 9(d). As shown in FIG. 9(a), a Ti film 84 is formed on the upper surface of a transparent glass substrate 80 whose lower surface is formed with a plurality of microlens elements 82. Then, a photoresist 86 is applied to the Ti film 84. Then, the photoresist 86 is exposed to light with a mask having a desired pattern corresponding to the pattern of holograms to be formed, and next developed to be patterned into a desired shape as shown in FIG. 9(b). Then, the Ti film 84 is etched and the glass substrate 80 is further etched by reactive ion etching as shown in FIG. 9(c). Then, the Ti film 84 is removed by etching to form a plurality of hologram elements 88 on the upper surface of the substrate 80 whose lower surface is formed with the plurality of microlens elements 82.

Figure 10:
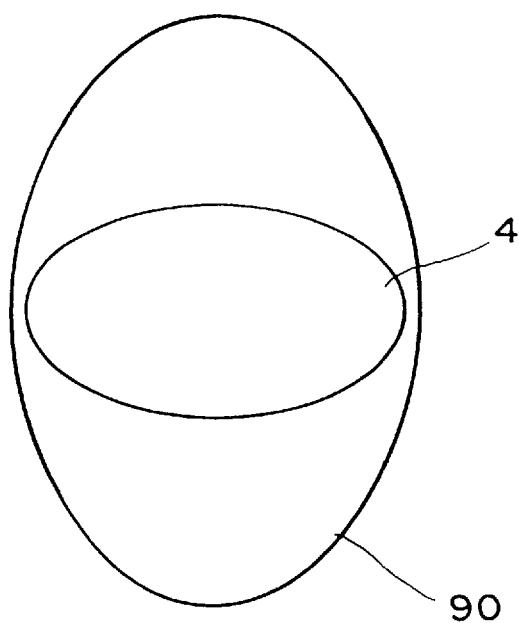
FIG. 10 is a view showing the relation between an elliptical lens and a beam shape.

As mentioned above, the beam emitted from the laser diode 2 has a substantially elliptical cross section. Therefore, it is preferable that the microlens 38 shown in FIG. 4 is formed in an elliptical shape and that the elliptical microlens 38 is positioned so that the major-axis direction of the elliptical beam 4 and the minor-axis direction of the elliptical microlens 38 coincide with each other. That is, as shown in FIG. 10, an elliptical lens 90 as the microlens 38 is positioned with respect to the elliptical beam 4. Such an elliptical microlens may be easily fabricated by forming each opening of the Ti film 52 in the step shown in FIG. 6(c) into an elliptical shape. The use of such an elliptical lens as the microlens 38 allows compensation for the astigmatic difference of the laser beam 4 emitted from the laser diode 2.

Figure 11:
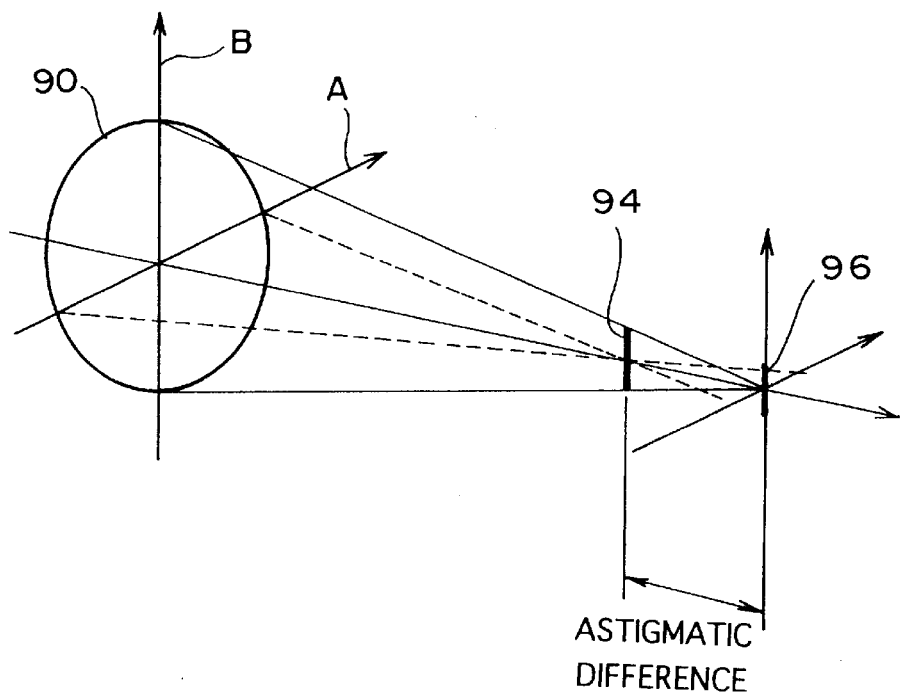
FIG. 11 is a view illustrating an astigmatic difference.

That is, letting A denote the minor-axis direction of the elliptical lens 90 and B denote the major-axis direction of the elliptical lens 90 as shown in FIG. 11, a component of light incident on the elliptical lens 90 along the minor-axis direction A is focused at a near position with respect to the elliptical lens 90 (sagittal focal line 94), because a portion of the ellipse corresponding to the minor-axis direction A has a radius of curvature larger than that of a portion of the ellipse corresponding to the major-axis direction B. Conversely, a component of the incident light along the major-axis direction B is focused at a far position with respect to the elliptical lens 90 (meridional focal line 96). Accordingly, an astigmatic difference occurs between the two focal lines 94 and 96. The astigmatic difference of the elliptical laser beam 4 can be compensated by positioning the elliptical lens 90 so that the major-axis direction of the elliptical laser beam 4 and the minor-axis direction of the elliptical lens 90 coincide with each other as shown in FIG. 10.

Figure 3:
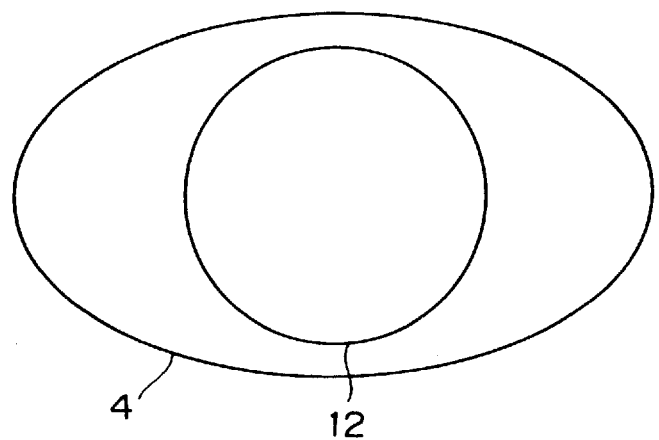
FIG. 3 is a view showing the relation between a beam shape and a collimator lens in the prior art.
Figure 12:
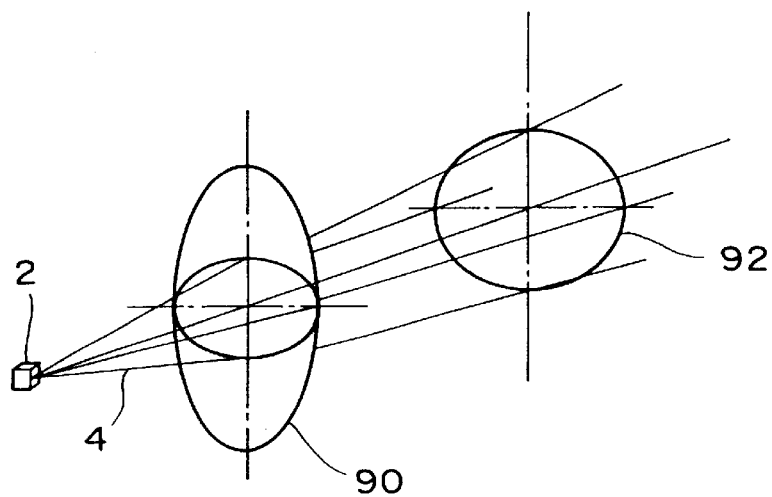
FIG. 12 is a view showing the relation between the position of the elliptical lens with respect to an emitted laser beam and the shape of the beam after transmitted through the elliptical lens.
Figure 13:
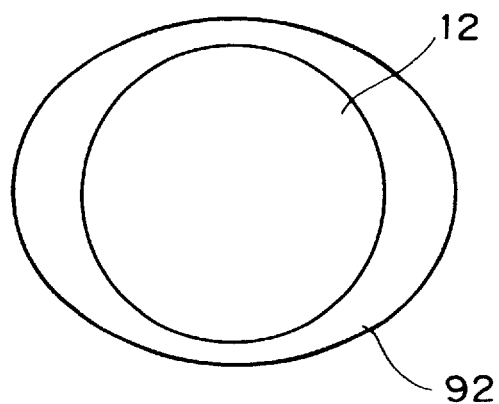
FIG. 13 is a view showing the relation between a collimator lens and the shape of the beam after transmitted through the elliptical lens.

FIG. 12 shows the relation between the position of the elliptical lens 90 with respect to the elliptical laser beam 4 and a beam shape 92 after transmission of the beam 4 through the lens 90. As apparent from FIG. 12, the ellipticity of the beam shape (beam pattern) 92 after transmission of the beam 4 through the elliptical lens 90 is relaxed. Referring to FIG. 13, there is shown the relation between the beam shape 92 after transmission of the beam 4 through the elliptical lens 90 and the shape of the collimator lens 12. As compared with the shape of the beam 4 in the prior art shown in FIG. 3, it is readily understood that the ellipticity of the beam shape 92 according to this preferred embodiment is relaxed.

Figure 14:
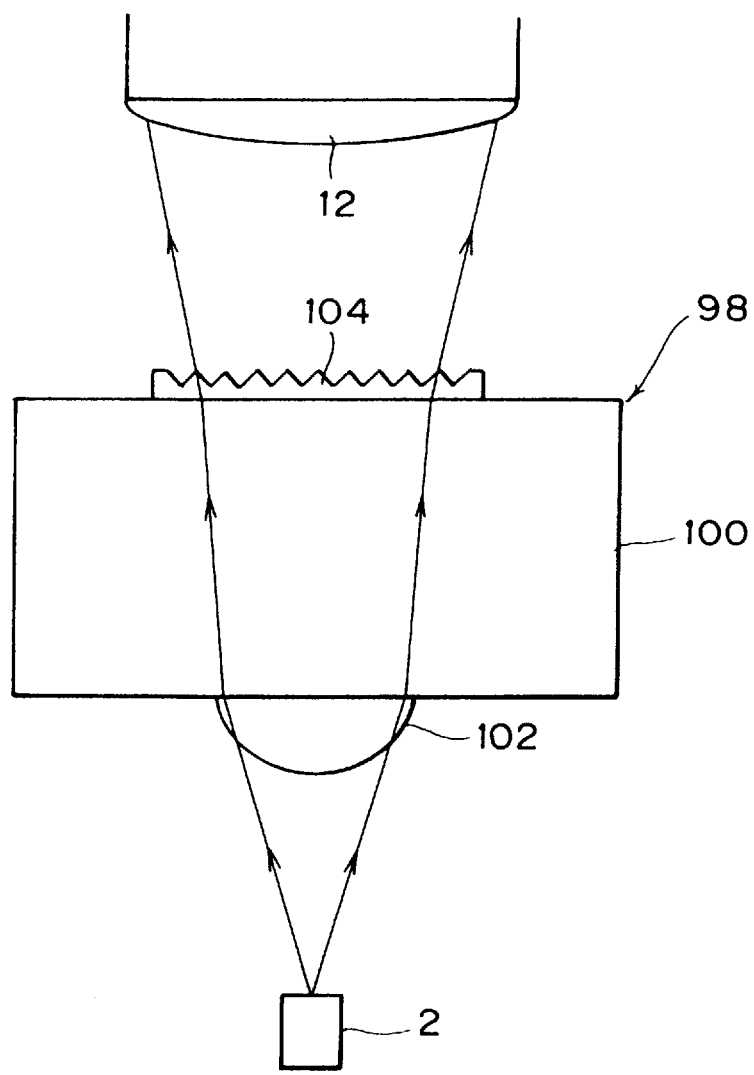
FIG. 14 is a view showing a part of an optical head according to a second preferred embodiment of the present invention.

Referring to FIG. 14, there is shown a part of an optical head according to a second preferred embodiment of the present invention. A hologram-lens unit 98 in this preferred embodiment is configured by forming a convex lens 102 on one surface of a plane glass substrate 100 and a hologram 104 on the other surface of the substrate 100. The convex lens 102 is fabricated by substantially the same method as that shown in FIG. 6(a) to FIG. 6(f). However, the diffusion time in the step shown in FIG. 6(e) is made longer to thereby cause a change in volume after the ion exchange and semispherically expand each ion diffused region. Such a semispherical expansion is utilized as the convex lens 102. The hologram 104 is fabricated by a photopolymer method (2P method) using ultraviolet hardening resin as shown in FIG. 8(a) to FIG. 8(c).

The convex lens 102 has a large numerical aperture (NA). Accordingly, the convex lens 102 can be made to serve also as a collimator lens. As a result, adjustment of the hologram 104 and the collimator lens 102 can be simplified. However, to prevent overlap of diffracted light from the hologram 104 on the convex lens 102, it is required to ensure a large angle of diffraction by the hologram 104 and also ensure a large thickness of the glass substrate 100. To this end, the photodetector unit 32 must be located farther from the laser diode 2.

From the viewpoint of simplification of a fabrication process for the convex lens 102, it is advantageous to adopt the 2P method. If the convex lens 102 is fabricated by using the ion exchange diffusion method, tens of hours are required for fabrication of the convex lens 102. To the contrary, several minutes are merely required for hardening of the ultraviolet hardening resin in the 2P method, so that the 2P method is greatly advantageous for mass production.

To fabricate the convex lens 102 by using the 2P method, a stamper as an original pattern is required. The stamper may be fabricated by various method such as (1) ion exchange diffusion, (2) photolithography using crystalline glass, and (3) mechanical cutting such as electrical discharge machining. In particular, the mechanical cutting is advantageous in accuracy because a microlens array having an arbitrary shape such as elliptical lenses, cylindrical lenses, or aspherical lenses can be accurately fabricated. Further, by setting the refractive index of the ultraviolet hardening resin used in the 2P method to substantially the same as the refractive index of the glass substrate as a base material, reflection loss at the interface between the resin layer and the glass substrate can be reduced to allow effective use of the laser beam.

Figure 15:
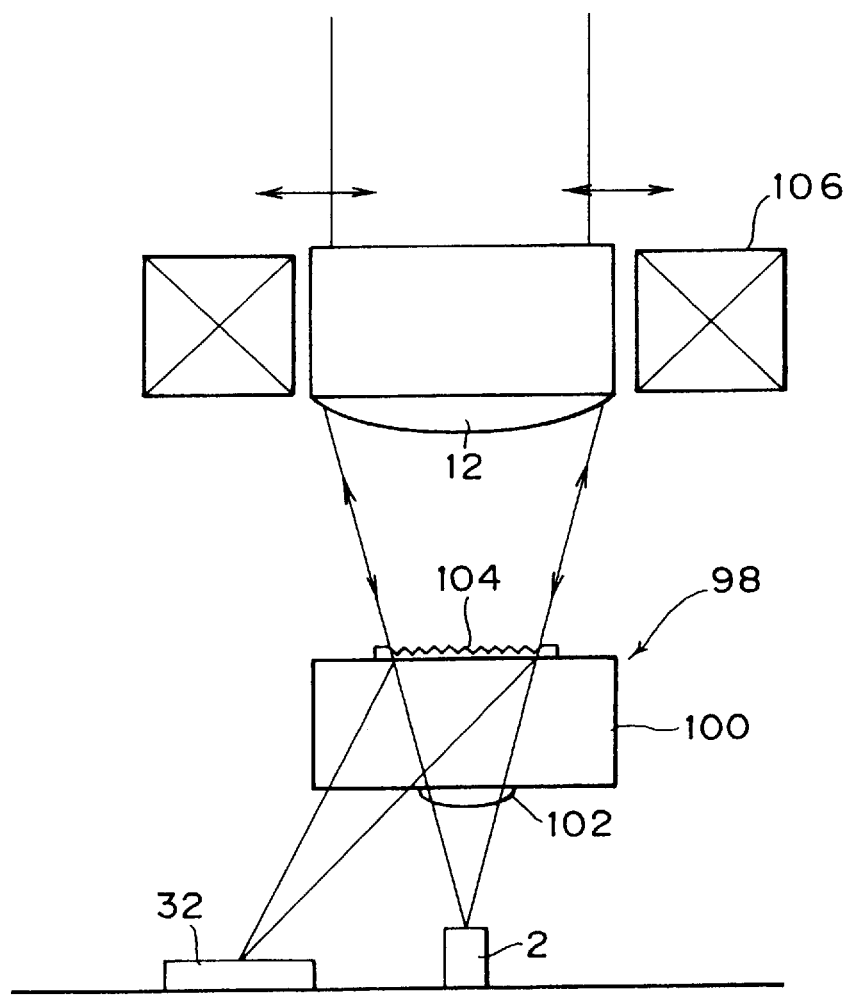
FIG. 15 is a view showing a part of an optical head according to a third preferred embodiment of the present invention.

Referring to FIG. 15, there is shown a part of an optical head according to a third preferred embodiment of the present invention. In this preferred embodiment, the hologram-lens unit 98 of the second preferred embodiment shown in FIG. 14 is used, and a drive mechanism 106 is further provided to move the collimator lens 12 in the direction across the tracks of a recording medium, thereby slightly changing tilt of a beam spot on the recording medium in the direction across the tracks of the recording medium. The drive mechanism 106 is constructed of a voice coil motor or a piezoelectric element, for example. In the event that the recording medium is inclined, the collimator lens 12 is slightly moved in the direction across the tracks of the recording medium by the drive mechanism 106, thereby correcting the tilt of the recording medium. The convex lens 102 is preferably formed as an elliptical lens.

Figure 16:
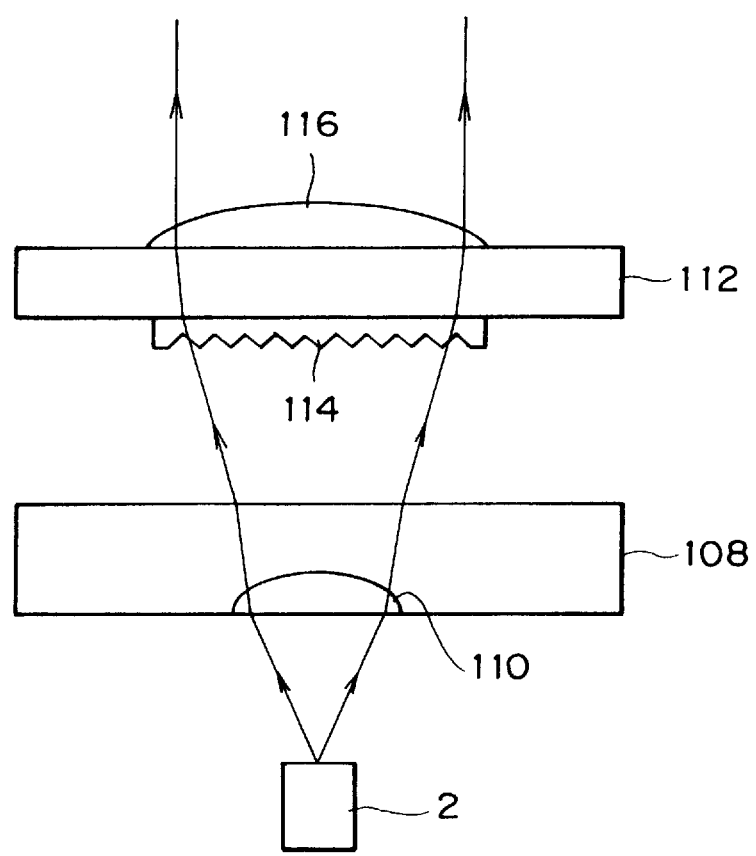
FIG. 16 is a view showing a part of an optical head according to a fourth preferred embodiment of the present invention.

Referring to FIG. 16, there is shown a part of an optical head according to a fourth preferred embodiment of the present invention. In this preferred embodiment, a hologram 114 and a collimator lens 116 are integrated. That is, a gradient index microlens 110 is formed in one surface of a plane transparent substrate 108. The hologram 114 is formed on one surface of a plane transparent substrate 112, and the collimator lens 116 is formed on the other surface of the substrate 112 by the above-mentioned method.

Accordingly, the optical system can be reduced in size without a large design change from the conventional optical system, and the need for adjustment of the hologram and the collimator lens can be eliminated. Further, light focusing characteristics can be improved by the gradient index microlens 110.

According to the present invention as described above, the light power loss due to the shape of the laser beam emitted from the laser diode can be reduced. Accordingly, it is possible to provide an optical head for an optical disk drive which can improve the efficiency of use of laser power. Further, since the microlens element and the hologram element are integrated, the optical system can be easily adjusted in assembling the optical disk drive.

What is claimed is:

1. An optical head for an optical disk drive, for reading and/or writing information on an optical disk, said optical head comprising:

a laser diode for emitting a laser beam, said laser beam having an elliptical beam pattern;

a signal detector for detecting a reflected beam reflected on said optical disk;

a first lens for collimating said laser beam emitted from said laser diode;

a transparent plane substrate interposed between said laser diode and said first lens, said transparent plane substrate having a first surface opposed to said laser diode and a second surface opposed to said first lens;

a second lens formed integrally with said transparent plane substrate on said first surface, said second lens having an elliptical shape corresponding to said elliptical beam pattern, said second lens being positioned so that a major-axis direction of said second lens coincides with a minor-axis direction of said elliptical beam pattern; and a hologram formed integrally with said transparent plane substrate on said second surface, for transmitting said laser beam emitted from said laser diode and diffracting said reflected beam toward said signal detector.

2. An optical head for an optical disk drive according to claim 1, wherein said second lens has an astigmatic difference.

3. An optical head for an optical disk drive according to claim 1, wherein said second lens has a gradient refractive index.

4. An optical head for an optical disk drive according to claim 1, further comprising a driving means for moving said first lens across tracks of said optical disk.

5. An optical head for an optical disk drive, for reading and/or writing information on an optical disk, said optical head comprising:

a laser diode for emitting a laser beam, said laser beam having an elliptical beam pattern;

a signal detector for detecting a reflected beam reflected on said optical disk;

a first transparent plane substrate interposed between said laser diode and said objective lens, said first transparent plane substrate having a first surface opposed to said laser diode and a second surface opposite to said first surface;

a hologram formed integrally with said first transparent plane substrate on said first surface, for transmitting said laser beam emitted from said laser diode and diffracting said reflected beam toward said signal detector;

a first lens formed integrally with said first transparent plane substrate on said second surface, for collimating said laser beam emitted from said laser diode; and a second lens interposed between said laser diode and said hologram, said second lens having an elliptical shape corresponding to said elliptical beam pattern, said second lens being positioned so that a major-axis direction of said second lens coincides with a minor-axis direction of said elliptical beam pattern.

6. An optical head for an optical disk drive according to claim 5, wherein said first lens comprises a convex lens, and said second lens comprises a gradient index lens formed integrally with a second transparent plane substrate in the vicinity of one surface of said second transparent plane substrate.

7. An optical head for an optical disk drive according to claim 6, wherein said second lens has an astigmatic difference.

8. An optical head for an optical disk drive, for reading and writing information on an optical disk, said optical head comprising:

a laser diode for emitting a laser beam, said laser beam having an elliptical beam pattern;

an objective lens for focusing said laser beam onto said optical disk;

an optical signal detector for detecting an optical signal from a reflected beam reflected on said optical disk;

an error signal detector for detecting a focusing error and a tracking error of said laser beam focused on said optical disk, from said reflected beam;

a first lens for collimating said laser beam emitted from said laser diode;

a transparent plane substrate interposed between said laser diode and said first lens, said transparent plane substrate having a first surface opposed to said laser diode and a second surface opposed to said first lens;

a second lens formed integrally with said transparent plane substrate on said first surface, said second lens having an elliptical shape corresponding to said elliptical beam pattern, said second lens being positioned so that a major-axis direction of said second lens coincides with a minor-axis direction of said elliptical beam pattern; and a hologram formed integrally with said transparent plane substrate on said second surface, for transmitting said laser beam emitted from said laser diode and diffracting said reflected beam toward said error signal detector.

9. An optical head for an optical disk drive, for reading and writing information on an optical disk, said optical head comprising:

a laser diode for emitting a laser beam, said laser beam having an elliptical beam pattern;

an objective lens for focusing said laser beam onto said optical disk;

an optical signal detector for detecting an optical signal from a reflected beam reflected on said optical disk;

an error signal detector for detecting a focusing error and a tracking error of said laser beam focused on said optical disk, from said reflected beam;

a first transparent plane substrate interposed between said laser diode and said objective lens, said first transparent plane substrate having a first surface opposed to said laser diode and a second surface opposite to said first surface;

a hologram formed integrally with said first transparent plane substrate on said first surface, for transmitting said laser beam emitted from said laser diode and diffracting said reflected beam toward said error signal detector;

a first lens formed integrally with said first transparent plane substrate on said second surface, for collimating said laser beam emitted from said laser diode; and a second lens interposed between said laser diode and said hologram, said second lens having an elliptical shape corresponding to said elliptical beam pattern, said second lens being positioned so that a major-axis direction of said second lens coincides with a minor-axis direction of said elliptical beam pattern.

10. An optical head comprising:

a laser emitting a laser beam having an elliptical beam pattern;

a first lens receiving the emitted laser beam;

a transparent plane substrate interposed between the laser and the first lens and having a first surface opposed to the laser and a second surface opposed to the first lens; and a second lens directing the laser beam from the laser to the first surface of the transparent plane substrate, the second lens having an elliptical shape corresponding to the elliptical beam pattern and the second lens being positioned so that a major-axis direction of the second lens coincides with a minor-axis direction of the elliptical beam pattern.

11. An optical head as in claim 10, further comprising:

a hologram formed integrally with the transparent plane substrate on the second surface.

12. An optical head as in claim 10, further comprising:

a hologram formed on the second surface of the transparent plane substrate.

13. An optical head according to claim 10, wherein the second lens has an astigmatic difference.

14. An optical head according to claim 10, wherein the second lens has a gradient refractive index.

15. An optical head according to claim 10, wherein the first lens is a collimating lens.

16. An optical head according to claim 10, wherein the first lens comprises a convex lens, and the second lens comprises a gradient index lens.

* * * * *

UNITED STATES PATENT AND TRADEMARK OFFICE
CERTIFICATE OF CORRECTION

PATENT NO. : 5,774,443
DATED : June 30, 1998
INVENTOR(S) : Shibano

It is certified that error appears in the above-identified patent and that said Letters Patent is hereby corrected as shown below:

Cover Page, Add the following references (from Information Disclosure Statement filed 12/29/97):

| | | |
|---|---|---|
| 5,231,620 | 7/27/93 | Ohuchida |
| 5,623,466 | 4/22/97 | Itonaga |
| 5,511,059 | 4/23/96 | Brazas, Jr. |
| 5,602,383 | 2/11/97 | Takekoshi et al. |

FOREIGN PATENT DOCUMENTS

| | | |
|---|---|---|
| WO 95/34015 | 12/14/95 | Europe |
| EP 0706175A1 | 10/04/96 | Europe |
| JP 07 272 301A | 10/20/95 | Japan |

Signed and Sealed this

Nineteenth Day of January, 1999

Attest:

Attesting Officer

*Acting Commissioner of Patents and Trademarks*